United States Patent
Wu

(10) Patent No.: US 6,477,167 B1
(45) Date of Patent: Nov. 5, 2002

(54) METHOD AND SYSTEM FOR ALLOCATING BANDWITH TO REAL-TIME VARIABLE BIT RATE (RT-VBR) TRAFFIC

(75) Inventor: Guoliang Wu, Plano, TX (US)

(73) Assignee: Fujitsu Network Communications, Inc., Richardson, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,504

(22) Filed: Jun. 3, 1999

(51) Int. Cl.[7] ............................................. H04L 12/56
(52) U.S. Cl. .................... 370/395.21; 370/230; 370/412
(58) Field of Search ............................. 370/395, 232, 370/230, 397, 253, 412, 468, 395.21; 709/233; 379/112, 112.04

(56) References Cited

U.S. PATENT DOCUMENTS

| | | | |
|---|---|---|---|
| 4,339,633 A | 7/1982 | Ahmed | 370/363 |
| 4,631,641 A | 12/1986 | Brombal et al. | 361/818 |
| 5,166,894 A | 11/1992 | Saito | 708/200 |
| 5,347,511 A | 9/1994 | Gun | 370/255 |
| 5,412,652 A | 5/1995 | Lu | 370/223 |
| 5,463,620 A | 10/1995 | Sriram | 370/412 |
| 5,467,348 A | 11/1995 | Fujii et al. | 370/468 |
| 5,583,857 A | 12/1996 | Soumiya et al. | 370/233 |
| 5,838,686 A | 11/1998 | Ozkan | 370/433 |
| 5,838,924 A | 11/1998 | Anderson et al. | 709/239 |
| 5,862,126 A | 1/1999 | Shah et al. | 370/395.21 |
| 5,881,049 A * | 3/1999 | Beshai et al. | 370/230 |
| 5,982,748 A * | 11/1999 | Yin et al. | 370/232 |
| 6,028,840 A | 2/2000 | Worster | 370/230 |
| 6,160,818 A * | 12/2000 | Berger et al. | 370/468 |
| 6,185,210 B1 * | 2/2001 | Troxel | 370/395 |
| 6,222,824 B1 * | 4/2001 | Marin et al. | 370/230 |

OTHER PUBLICATIONS

McDysan, David E., et al., ATM Theory and Application. McGraw–Hill, Inc. ISBN 0–07–060362–6, pp. 365–385, 1994.

Erdengiz, Ali, "ATM Usage Policing and Traffic Shaping," Communications System Design (Jan. 1997).

Dobrowski, George et al., ATM User–Network Interface Specification, Version 3.1, The ATM Forum, Sep., 1994.

Cerent 454™ High Speed SONET/SDH Transport System, ALTS trade show Las Vegas, Nevada on or about Dec., 1998.

"FLM 150 ADM LAN Extension Product Design Specification," Revision 1.1, Internal Design Specification for Product, sheets 6/353–10/353 and 72/353–75/353, Product publicly released on or about Dec., 1998.

"Product Design Specification (PDS) for FLASH–192, Release 1," Internal Design Specification for Product, pp. 1/916; 4–12/9161 315–320/916, Product publicly released on or about Mar., 1999.

(List continued on next page.)

Primary Examiner—Hassan Kizou
Assistant Examiner—John Pezzlo
(74) Attorney, Agent, or Firm—Baker Botts L.L.P.

(57) ABSTRACT

A method for allocating transmission bandwidth to a group of real-time variable bit rate connections includes determining an acceptable cell loss probability for a real-time variable bit rate group based on quality of service requirements for real-time variable bit rate connections in the real-time variable bit rate group. An allocation bandwidth is determined for the real-time variable bit rate group from a probability density function of an aggregate cell arrival rate for the real-time variable bit rate group. The allocation bandwidth is the bandwidth that the probability of the aggregate cell arrival rate exceeding the bandwidth is less than or at least substantially equal to the acceptable cell loss probability.

26 Claims, 2 Drawing Sheets

OTHER PUBLICATIONS

"InterNetworking Systems; AnyMedia® Access Products; AnyMedia Access System," http://www.lucent.com/ins/products/anymedia.html. Printed Aug. 10, 2000.

"ÁnyMedia® Access System," Lucent Technologies, Inc. Marketing Communications. Sep., 1999.

"The AnyMedia™ Access System Anything's Possible," Lucent Technologies, Inc. Marketing Communications, 1997.

Photography of Northern Telecom Card, card dated Apr., 1998.

Held, G., Understanding Data Communications, Fifth Edition, Sams Publishing, ISBN No. 0–672–30934–3, Chapter 14, pp. 419–431, 1996.

McCloghrie, K., et al., "Measurement Information Base for Network Management of TCP/IP–based internets: MIB–II," SNMP Working Group, Mar. 1991.

"Draft New Recommendation 1.630 (ATM Protection Switching)," ITU Telecommunication Standardization Sector, COM–13–41–E, Sep., 1998.

Guérin, R., et al., "Equivalent Capacity and Its Application to Bandwidth Allocation in High–Speed Networks," IEEE Journal on Selected Areas in Communications, vol. 9, No. 7, pp. 968–981.

Gün, L., et al., "Bandwidth Management and Congestion Control Framework of the Broadband Network Architecture," Computer Networks and ISDN Systems 26, Elsevier Science Publishers B.V., North–Holland, pp. 61–78, 1993.

"S/DMS TransportNode 'OC–3 Express'—Cost–Effective SONET Transport for Low–Capacity Applications", Northern Telecom Marketing Publications, Issue 1, pp. 1–31, Sep. 27, 1996.

Universal Serial Bus Specification Revision 1.1, Compaq Computer Corporation, Intel Corporation, Microsoft Corporation, NEC Corporation. Sep. 23, 1998.

"MMC Products," http://www.mc–net.com/top–roducts/productdescriptions.html, Printed Jul. 22, 1999.

"MMC Network's Products: AnyFlow 5400," http://www.mmcnet.com/Solutions/anyflow5400.asp., Printed Feb. 7, 2000.

"MMC Network's Products: AnyFlow 5500," http://www.mmcnet.com/Solutions/anyflow5500.asp. Printed Feb. 7, 2000.

"AnyFlow 5400 Product Overview," MMC Networks. Undated.

"AnyFlow 5500 Product Overview," MMC Networks. Undated.

SwitchStAR™ ATM Cell Based 8×8 Non–Blocking Single Chip Switching Memory, Preliminary IDT77V400, Commercial Temperature Range, Integrated Device Technology, Inc., pp. 1–23, May, 1998.

SwitchStAR™ ATM Cell Based 8×8 Non–Blocking Single Chip Switch Controller, Preliminary IDT77V500, Commercial Temperature Range, Integrated Device Technology, Inc., pp. 1–14, May, 1998.

Giroux, Natalie et al., Traffic Mangaement Specification, Version 4.0, af–tm–0056.000, The ATM Forum, Apr., 1996.

M4 Interface Requirements and Logical MIB, af–nm–0020, 000, The ATM Forum. Oct., 1994.

PCT Search Report in International Application No. PCT/US 00/15130, dated Aug. 21, 2000, 7 pages.

Hiroshi Saito, "Call Admission Control in an ATM Network Using Upper Bound of Cell Loss Probability," *IEEE Transactions on Communications,* vol. 40, No. 9, Sep., 1992, 10 pages.

Khosrow Sohraby, "On the Theory of General ON–OFF Sources With Applications in High–Speed Networks," IEEE Infocom '93 Twelfth Annual Joint Conference of the IEEE Computer and Communications Societies, Mar. 28, 1993, 11 pages.

Shim, et al., "Modeling and Call Admission Control Algorithm of Variable Bit Rate Video in ATM Networks," *IEEE Journal on Selected Areas in Communications,* vol. 12, No. 2, Feb., 1994, 13 pages.

\* cited by examiner

METHOD AND SYSTEM FOR ALLOCATING BANDWITH TO REAL-TIME VARIABLE BIT RATE (RT-VBR) TRAFFIC

TECHNICAL FIELD OF THE INVENTION

This invention relates generally to the field of telecommunication networks, and more particularly to a method and system for allocating bandwidth to real-time variable bit rate (rt-VBR) traffic in a telecommunications network.

BACKGROUND OF THE INVENTION

Telecommunications networks have traditionally been circuit-switch networks that have transmission paths dedicated to specific users for the duration of a call and that employ continuous, fixed-bandwidth transmission. Due to growth in data traffic created by the Internet and its related technologies, however, telecommunications networks are being moved to a packet-switching transmission model. Packet-switch networks provide a large range of digital services, from data to video to basic voice telephony. Packet-switch networks can allow dynamic bandwidth and may be connectionless with no dedicated path or connection-oriented with virtual circuits and dedicated bandwidth along a predetermined path.

Asynchronous transfer mode (ATM) is a connection-oriented packet-switching technology in which information is organized into small, fixed length cells. ATM carries data asynchronously, automatically assigning data cells to available time slots on demand to provide maximum throughput. Compared with other network technologies, ATM provides large increases in maximum supported bandwidth, designed-in asynchronous traffic support, support for multiple types of traffic such as data, video, and voice transmissions on shared communication lines, and virtual networking capabilities, which increase bandwidth utilization with high quality of service and ease network administration.

ATM cells are routed through a telecommunications network at high speeds using a switching label included in the cell. The switching label has two sections that define a virtual path (VP) and a virtual channel (VC) in the network through which the cell is routed. The use of virtual paths and virtual channels allows physical bandwidth in the network to be subdivided and separately commercialized.

Because of the low latency and predictability throughput ATM offers, it is capable of providing quality of service (QoS) features. QoS is defined in terms of the attributes of end-to-end ATM connections and is important in an integrated service network, particularly for delay-sensitive and/or loss sensitive applications such as audio and video transmissions, as well as voice-over IP. Other applications in which QoS may be important include traditional data communications, imaging, full-motion video, and multimedia, as well as voice.

Performance criteria for describing QoS for a particular connection include cell loss rate (CLR), cell transfer delay (CTD), and cell delay variation (CDV). ATM traffic is classified as either constant bit rate (CBR) traffic, real-time variable bit rate (rt-VBR) traffic, non real-time variable bit rate (nrt-VBR) traffic, available bit rate (ABR) traffic, and unspecified bit rate (UBR) traffic depending on the QoS parameters applied to the traffic. CBR and rt-VBR traffic visualize dedicated bandwidth and are intended for real time applications. ABR and nrt-VBR traffic is intended for non-real time applications which can control, on demand, their transmission rate in a certain range. Like ASR, UBR traffic is intended for non-real time applications which do not have any constraints on the cell delay and cell delay variations.

For rt-VBR which is used for voice, video, and image data, traffic parameters include peak cell rate (CPR), cell delay variation tolerance (CDVT), sustained cell rate (SCR) which is the average cell rate over time, and maximum burst size (MBS). To insure QoS for rt-VBR connections while minimizing resource over-allocation, rt-VBR traffic is statistically multiplexed together and allocated a fixed bandwidth based on the Markovian modulated Poisson, Markovian fluid flow, batch Poisson and other similar models. These models, however, are complex and thus difficult to implement in an operating environment. In addition, the models are artificial and therefore can result in both over and under allocation of resources.

SUMMARY OF THE INVENTION

The present invention provides an improved method and system for allocating bandwidth to real-time variable bit rate (rt-VBR) traffic in an asynchronous transport mode (ATM) telecommunications network that substantially eliminates or reduces disadvantages and problems associated with previous systems and methods. In particular, bandwidth is allocated to rt-VBR traffic at an egress port or link based on a probabilistic method that achieves statistical multiplexing gain and high bandwidth utilization.

In accordance with one embodiment of the present invention, a method for allocating transmission bandwidth to a group of real-time variable bit rate connections includes determining an acceptable cell loss probability for a real-time variable bit rate group based on quality of service requirements for real-time variable bit rate connections in the real-time variable bit rate group. An allocation bandwidth is determined for the real-time variable bit rate group from a probability density function of an aggregate cell arrival rate for the real-time variable bit rate group. The allocation bandwidth is the bandwidth that the probability of the aggregate cell arrival rate exceeding the bandwidth is less than or at least substantially equal to the acceptable cell loss probability.

More specifically, in accordance with a particular embodiment of the present invention, the allocation bandwidth is allocated at a network element for transmission of the real-time variable bit rate connections on an egress link. In another embodiment, the real-time variable bit rate group includes a requested real-time variable bit rate connection. In this embodiment, the network element accepts the requested real-time variable bit rate connection and allocates the allocation bandwidth in response to determining the allocation bandwidth is available for allocation at the network element. The allocation bandwidth is preferably a minimum bandwidth at which the probability of the aggregate cell arrival rate exceeding the bandwidth is less than or equal to the acceptable cell loss probability.

Technical advantages of the present invention include providing an improved method and system for allocating bandwidth to rt-VBR and other suitable types of dynamic traffic in a telecommunications network. In particular, bandwidth is allocated to rt-VBR traffic using a probabilistic method based on traffic parameters. Accordingly, under or over allocation is minimized while achieving required cell loss ratio and guaranteed cell delay parameters. In addition, the method is general for various actual cell arrival processes. This is accomplished by using a worst case scenario for cell arrival models such that no further cell arrival characterizations are necessary. The method conforms to standardized traffic descriptors and can be simplified for efficient operation within an ATM node.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
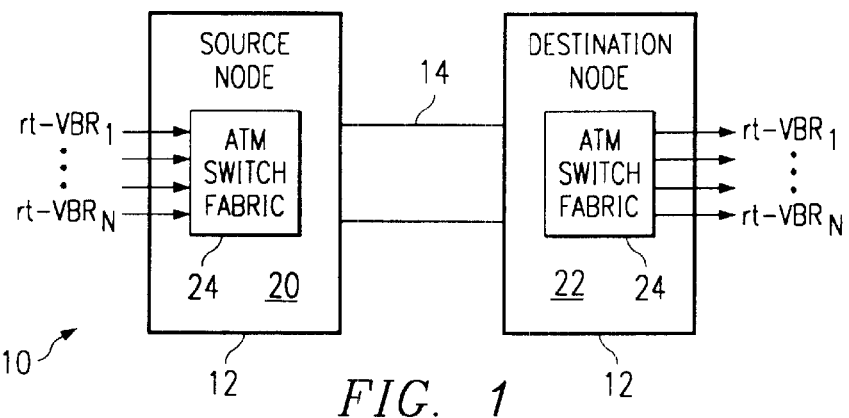
FIG. 1 is a block diagram illustrating a telecommunications network for transmitting real-time variable bit rate (rt-VBR) and other traffic in accordance with one embodiment of the present invention.

FIG. 1 illustrates a telecommunications network 10 for transmitting asynchronous transfer mode (ATM) traffic in accordance with the one embodiment of the present invention. The telecommunications network 10 transmits voice, video, data, and other suitable types of information, and/or a combination of different types of information between remote locations. The telecommunications network 10 may be a public network such as the Internet, a private network such as an Intranet implemented on a local area network (LAN) or wide area network (WAN), or be suitably distributed across disparate networks.

Referring to FIG. 1, the telecommunications network 10 includes a plurality of nodes 12 interconnected by transmission line 14. The nodes 12 each comprise a network element (NE) capable of communicating traffic in the telecommunications network 10. The nodes 12 may be a switch, router, add/drop multiplexer or other suitable device capable of directing traffic in the telecommunications network 10.

The transmission line 14 provides a physical interface between the nodes 12. The physical interface is defined by the bandwidth of the connecting transmission line 14 which may be a DS-3 link, an OC-3 line, an OC-12 line or any other suitable type of line having similar or other bandwidths. The transmission line 14 may comprise optical fiber, cable, twisted wire, or other suitable wire line or wireless link capable of transporting traffic between two nodes 12.

For the embodiment of FIG. 1, the telecommunications network includes a source node 20 and a destination node 22. The nodes 20 and 22 are each ATM elements or multi-protocol elements having functionality for processing ATM traffic in which information is organized into small, fixed length cells. The ATM cells are routed by the source and destination nodes 20 and 22 using a switching label included in the ATM cell. The switching label has two sections that define a virtual path (VP) and a virtual channel (VC) in the telecommunications network 10 through which the ATM cell is routed. Use of VPs and VCs allows physical bandwidth of the transmission line 14 to be subdivided into virtual constructs and separately commercialized.

The source and destination nodes 20 and 22 each include ATM switch fabric 24 that receives ATM traffic, performs address translation for switching labels in the traffic, and transmits the traffic in accordance with the translated switching labels. The ATM traffic comprises constant bit rate (CBR) traffic, real-time variable bit rate (rt-VBR) traffic, non real-time variable bit rate (nrt-VBR) traffic, available bit rate (ABR) traffic, and unspecified bit rate (UBR) traffic. The CBR traffic utilizes substantially constant bandwidth and is intended for real-time applications such as audio, video, and voice-over IP transmissions. The rt-VBR traffic is also used for real-time applications, but is bursty in nature with cells rates that change quickly and dramatically. ABR, UBR and nrt-VBR traffic are also bursty in nature. ABR traffic is intended for real-time applications which can control, on demand, their transmission rate in a certain range. The nrt-VBR and UBR traffic is intended for non real-time applications which do not have tight constraints on cell delay and cell delay variation.

Quality of service (QoS) levels are defined for each traffic type based on peak cell rate (PCR), cell loss rate (CLR), cell transfer delay (CTD), and cell delay variation (CDV). For rt-VBR and other types of dynamic traffic, the QoS levels further specify sustained cell rate (SCR) and maximum burst size (MBS). Traffic is dynamic when it is subject to change, has bandwidth that can be shared between connections, and/or has a rate within a range.

Figure 2:
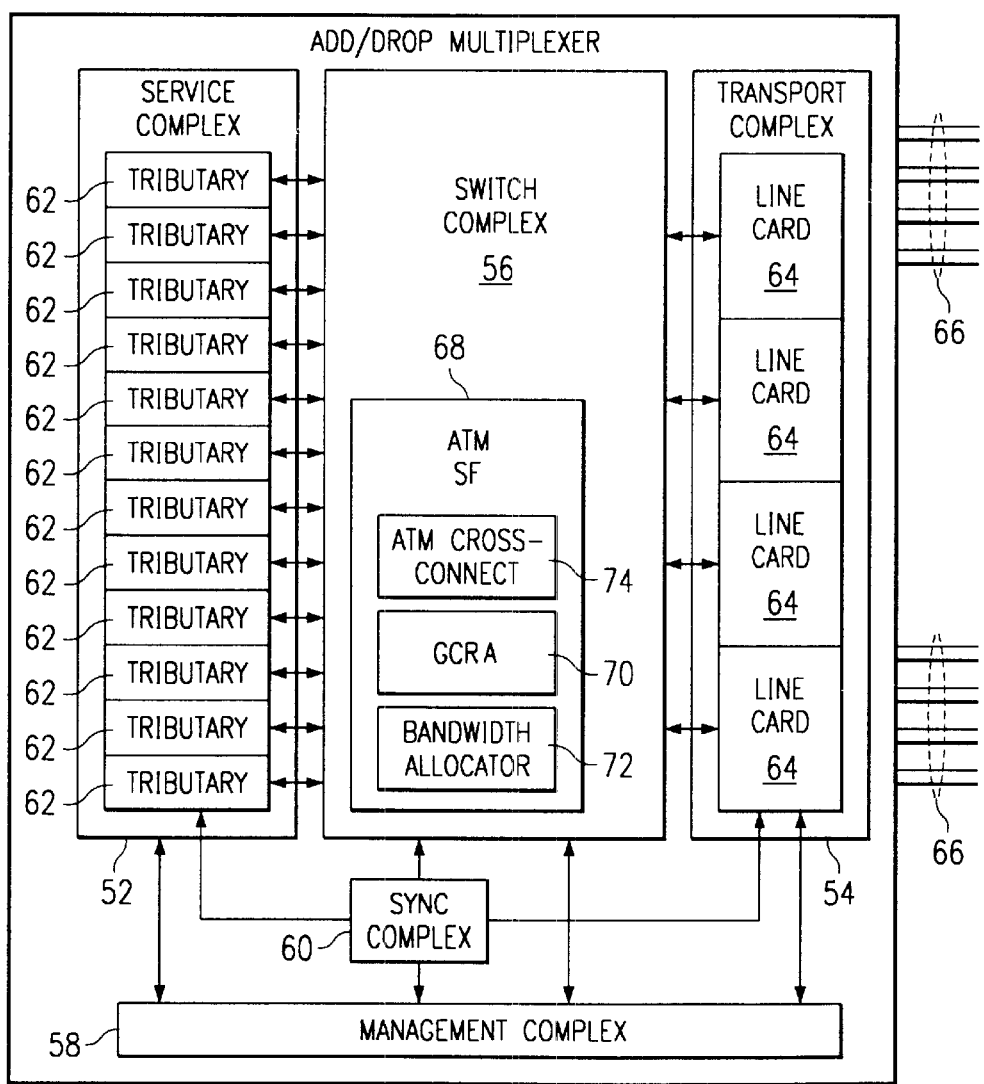
FIG. 2 is a block diagram illustrating an add\drop multiplexer element for the telecommunications network of FIG. 1 in accordance with one embodiment of the present invention.

FIG. 2 illustrates details of the source and destination nodes 20 and 22 in accordance with one embodiment of the present invention. In this embodiment, the nodes 20 and 22 are each a multi-protocol add/drop multiplexer 50. The add/drop multiplexer 50 includes a service complex 52, a transport complex 54, switch complex 56, a management complex 58, and a synchronization complex 60. The disparate complexes 52, 54, 56, 58, and 60 are interconnected by one or more networks or backplanes within the add/drop multiplexer 50.

Referring to FIG. 2, the service complex 52 includes a plurality of tributary cards 62. The tributary cards 62 each receive customer input/output (I/O) and perform conversions necessary for processing by the switch complex 56.

The transport complex 54 includes a plurality of line cards 64 for transmitting data on the transmission lines 66. In a particular embodiment, the line cards 64 are OC-3 or OC-12 line cards that are bi-directional and can handle optical to electrical (O/E) and electrical to optical (E/O) conversions. In this embodiment, the line cards 64 also handle the line and selection overhead extraction and insertion.

The switch complex 56 includes a plurality of switch fabrics including an ATM switch fabric 68. The ATM switch fabric 68 may include functionality outside the switch complex 56 and is implemented in part by software stored on a computer-readable medium for execution by a processor of the add/drop multiplexer 50. The computer-readable medium is a random access memory (RAM), a read only memory (ROM), or other suitable medium capable of storing programming instructions for execution by the processor.

The ATM switch fabric 68 includes a generic cell rate algorithm (GCRA) 70, ATM resource allocator 72, and ATM cross-connect 74. The GCRA 70 monitors incoming ATM traffic for compliance with transmission contracts and terminates noncompliant ATM cells. The ATM resource allocator 72 is part of a connection admission control system for the add/drop multiplexer 50. As described in more detail below, the ATM resource allocator determines whether the node can accept additional ATM connections based on available bandwidth and allocates bandwidth in response to accepting a connection. In particular, the bandwidth allocator 72 determines whether sufficient bandwidth is available at a port for supporting a requested rt-VBR connection. If sufficient bandwidth is available, the bandwidth allocator 72 accepts a connection and allocates the required bandwidth. If sufficient bandwidth is not available, the bandwidth allocator 72 declines the connection in order to prevent overallocation of resources and resulting in ability to meet QoS requirements. The ATM resource allocator 82 allocates bandwidth by itself performing the allocation functions or by initiating or approving allocation by another component in the ATM switch fabric 68, switch complex 56, or add/drop multiplexer 50.

The ATM switch fabric 68 receives ATM cells on an input port and switches them to an output port using the ATM cross-connect 74. In switching the ATM cells, the ATM switch fabric 68 first translates necessary VP and VC addresses in the switching label of the ATM cells.

The management complex 58 monitors and controls the status of the service, transport, switch, and synchronization complexes 52, 54, 56, and 60. The management complex 58 also maintains alarm, protection switching, and provisioning databases for the add/drop multiplexer 50. The synchronization complex 60 synchronizes the service, transport, and switch 12 complexes 52, 54, and 56 by providing a stable traceable reference clock.

Figure 3:
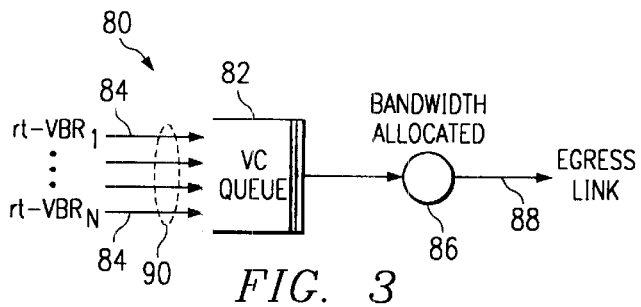
FIG. 3 is a block diagram illustrating a traffic multiplexing model for allocating bandwidth to rt-VBR traffic in the telecommunications network of FIG. 1 in accordance with one embodiment of the present invention.

FIG. 3 is a block diagram illustrating a traffic multiplexing model 80 for rt-VBR and other suitable dynamic traffic in accordance with one embodiment of the present invention. In this embodiment, bandwidth is shared within a group of rt-VBR connections based on a weighted round robin process under per-VC queuing. The weight of an individual connection is determined at the call admission time and is set to satisfy the QoS requirements of the connection. The weighted round robin system is a work conservation system with no bandwidth wasted as long as there is untransmitted rt-VBR cells in the system. As described in more detail below, the traffic multiplexing model 80 is used by the ATM resource allocator 72.

Referring to FIG. 3, the traffic multiplexing model 80 includes a VC queue 82 for rt-VBR connections $84_{1-n}$, allocation bandwidth 86 through which the rt-VBR traffic 84 is to be transmitted on an egress link 88. The rt-VBR connections 84 are statistically multiplexed together in the traffic multiplexing model 80 to form an rt-VBR group 90 for purposes of bandwidth allocation.

The VC queue 82 absorbs cell clumping during peak traffic periods. In one embodiment, the size of the VC queue 82 is determined in accordance with the method described in co-owned U.S. patent application Ser. No. 09/325,695, entitled "Method and System for Allocating Bandwidth and Buffer Resources to Constant Bit Rate (CBR) Traffic," filed Jun. 3, 1999, which is hereby incorporated by reference. It will be understood that the VC queue 82 size may be otherwise suitably determined without departing from the scope of the present invention. The VC queue 82 may be implemented in physically shared memory on the ATM switch fabric 68 of the add/drop multiplexer 50.

Within the traffic multiplexing model 80, the cell arrival processes from the different rt-VBR connections 84 are statistically independent. Each rt-VBR connection 84 can be in one of two states: active (peak) state or inactive state. When in the active state, the cell arrival rate is its PCR. When in the inactive state, the cell arrival rate is zero. Thus, the rt-VBR connection 84 alternates between the two states. This on/off model provides the worst case scenario of cell arrival models. Accordingly, no further cell arrival characterizations are necessary and the model 80 is general for various actual cell arrival processes.

The allocated bandwidth 86 for the rt-VBR group 90 is determined based on the following probabilistic method:

$$P\left\{\sum_i X_i(t) > R\right\} < \varepsilon \tag{1}$$

In equation 1, $X_i(t)$ is the random variable representing the instant cell arrival rate from the $i^{th}$ rt-VBR connection. R is the allocation bandwidth needed to support the rt-VBR group 90. $\varepsilon$ is the acceptable cell loss probability which can be derived from the end-to-end QoS requirements. In one embodiment, $\varepsilon$ comprises the lesser of the CLR or CDV for the rt-VBR group 90. The CLR for the rt-VBR group 90 may be the lowest CLR for any single rt-VBR connection 84 within the group 90. In another embodiment, $\varepsilon$ is the cell transfer delay (CTD) Quantile. Similarly, the CDV for the rt-VBR group 90 may be the lowest CDV for any of the rt-VBR connections 84 within the group 90. In this way, it is assured that the QoS requirements for each of the rt-VBR connections 84 will be satisfied. As used herein, each means every one of at least a subset of identified items. All arriving cells, except a small portion less than or at least substantially equal to the acceptable cell loss probability will be transmitted immediately upon the arrival with minimal delay. Even if that small portion of cells that is less than or equal to the acceptable cell loss probability is dropped or delayed, the CLR and CDV QoS requirements are still satisfied.

The aggregate cell arrival rate, denoted by X, is the sum of N individual arrival rates for the rt-VBR connections 84 which may be expressed as follows:

$$X = \sum_{i=1}^{N} X_i \tag{2}$$

The probability density function of X, denoted by p(x), equals:

$$p(x) = p_1(x) \otimes \ldots \otimes P_N(X) \tag{3}$$

In equation 3, $P_i(x)$ is the probability density function of $x_i$ (i=1, 2, . . . , N) and $\otimes$ denotes the convolution. The probability density function for the aggregate cell arrival rate of the rt-VBR group 90 in the traffic multiplexing model 80 is illustrated by FIG. 4.

Figure 4:
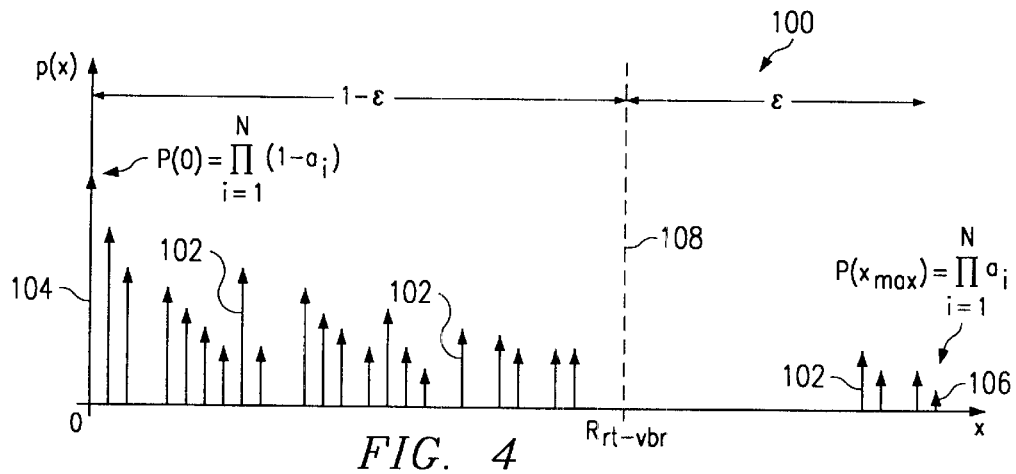
FIG. 4 is a chart diagram illustrating a probability density function of an aggregated rt-VBR cell arrival rate for a group of vr-VBR connections in accordance with one embodiment of the present invention.

Referring to FIG. 4, the probability density function 100 comprises a number of Dirac-Delta functions 102 located between zero and a total PCR for the rt-VBR group 90, which is the summation of the PCRs for each of the rt-VBR connections 84. In the probability density function 100, zero represents the minimum aggregated cell arrival rate 104 at which no traffic is received from any of the rt-VBR connections 84. The total PCR represents the maximum aggregate cell arrival rate 106 at which traffic is received at PCR (because of the on/off model) from all of the rt-VBR connections 84. The probability of the minimum and maximum rates 104 and 106 are calculated as shown.

In the probability density function 100, the allocation bandwidth ($R_{rt}$-VBR) 108 is preferably the smallest value such that the sum of the probabilities for x greater than or equal to the allocation bandwidth 108 will be less than the acceptable cell loss probability. Accordingly, bandwidth allocation is minimized while insuring QoS requirements for the rt-VBR group 90 are satisfied.

With N rt-VBR connections 84, there are up to $2^N$ values that the aggregated cell rate can take. The probability at these rates are represented by the Dirac-delta functions 102. For large systems with hundreds of thousands of rt-VBR connections 84, an exhaustive search to find the allocation bandwidth 108 within the probability density function 100 may be impractical.

To the make the method more efficient for large systems, the PCR values of the N rt-VBR connections 84 are arranged as illustrated by Table 1. Referring to Table 1, the rt-VBR connections are arranged in PCR ascending order, together with their respective active ratio values. The active ratio value, denoted by a, is equal to SCR/PCR.

TABLE 1

| rt-VBR Connection No. | PCR Value | Active Ration |
|---|---|---|
| 1 | $PCR_1$ | $a_1$ |
| 2 | $PCR_2$ | $a_2$ |
| ... | ... | ... |
| ... | ... | ... |
| N | $PRC_N$ | $a_N$ |

The $2^N$ aggregated cell rates from Table 1, together with their probability values, are divided into a number of groups each representing a specific number of real-time variable bit rate connections received at a time. Accordingly, as shown by Table 2, there are N+1 groups. Each group contains a number of events in probability space of the probability density function 100, with each event represented by a cell rate value and its probability.

TABLE 2

| Group No. | Events | Probability | Maximum x Value |
|---|---|---|---|
| 0 | All N connection is OFF state | $\prod_{i=1}^{N}(1-a_i)$ | 0 |
| 1 | 1 connection is ON state, (N-1) connections in OFF state | $\left(\prod_{i=1}^{N}(1-a_i)\right)\cdot \sum_{j=1}^{N}\dfrac{a_j}{1-a_j}$ | $PCR_N$ |
| 2 | 1 connections is ON state, (N-1) connections in OFF state | ... | $PCR_N + PCR_{N-1}$ |
| ... | ... | ... | ... |
| ... | ... | ... | ... |
| N-1 | (N-1) connections is ON state, 1 connection in OFF state | $\left(\prod_{i=1}^{N}a_i\right)\cdot \sum_{j=1}^{N}\dfrac{1-a_j}{a_j}$ | $PCR_N + \ldots + PCR_2$ |
| N | All N connections in ON state | $\prod_{i=1}^{N}a_i$ | $PCR_N + \ldots + PCR_1$ |

Using the groups, a fast search may be used to determine the allocation bandwidth 108 based on the group probabilities instead of the probabilities of each individual cell rate. In this way, the exhaustive search, which is exponential to 2N, is replaced by a linear N-search. The fast search finds the smallest integer between 1 and N such that:

$$1-\varepsilon \le \sum_{i=0}^{k} P_i \qquad (4)$$

In equation 4, $P_i$ is the probability of Group $_i$. The allocation bandwidth 108, denoted $R_{rt\text{-}VBR}$, is then determined as:

$$R_{rt-vbr} = \sum_{j=N-k+1}^{N} PCR_j \qquad (5)$$

Because the ranges of the rate values of the different groups may overlap, probabilities below the allocation bandwidth 108 are equal to or greater than the sum of probabilities of the groups. As a result, the allocation bandwidth 108 may be slightly over-allocated using the fast search method. However, the loss requirement is guaranteed.

To further simply processing and improve efficiency within a network element, the probability of each group may be approximated by using an intermediate variable q which is the defined as:

$$q = \frac{1}{N}\cdot \sum_{i=1}^{N} \frac{a_i}{1-a_i} \qquad (6)$$

The probability for a group j is then:

$$P_j = \left(\prod_{i=1}^{N}(1-a_j)\right)\cdot \sum_{i_1=1}^{N-j+1}\ldots \sum_{i_j=i_{j-1}+1}^{N} \frac{a_{i_j}}{1-a_{i_j}}\ldots \frac{a_{i_j}}{1-a_{i_j}} \qquad (7)$$

$$\approx \left(\prod_{i=1}^{N}(1-a_j)\right)\cdot \binom{N}{j}\cdot q^j$$

This approximation becomes accurate when the rt-VBR connections 84 are homogenous or have the same or similar active ratios. Using this approximation, the resource allocator 72 may recursively determine the allocation bandwidth 104. The recursive method increases computational efficiency of the implementation within the network element.

FIG. 6 is a flow diagram illustrating the recursive method for determining allocation bandwidth using the approximation of group probabilities defined above. It will be understood that the bandwidth allocation methodology may be otherwise suitably implemented recursively or otherwise without departing from the scope of the present invention.

Figure 5:
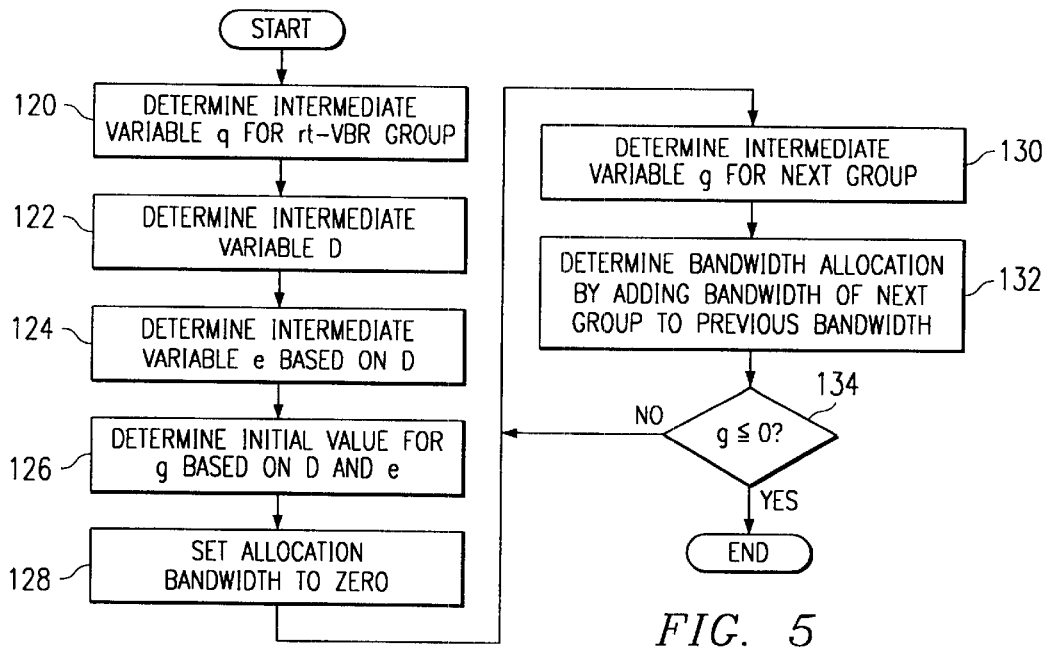
FIG. 5 is a flow diagram illustrating a method for determining bandwidth allocation for rt-VBR traffic in the telecommunications network of FIG. 1.

Referring to FIG. 5, the method begins at step 120 in which a first intermediate variable, denoted q, is defined as:

$$q = \frac{1}{N} \cdot \sum_{i=1}^{N} \frac{a_i}{1-a_i} \quad (8)$$

At step 122, a second intermediate variable, denoted D, is determined as follows:

$$D = \prod_{i=1}^{N} (1-a_i) \quad (9)$$

Next, at step 124, a third intermediate variable, denoted e, is determined based on D:

$$e = (1-D) \cdot CLR \quad (10)$$

Proceeding to step 126, an initial value for a fourth intermediate variable, denoted g, is determined based on the second and third intermediate variables D and e:

$$g = \frac{1-e}{D} - 1 \quad (11)$$

At step 128, the allocation bandwidth 108 is initially set to zero. Next, at step 130, the fourth intermediate variable g is redetermined for a next group based on its previous value, and the first intermediate variable q:

$$g = \frac{g}{\frac{N-J+1}{J} \cdot q} - 1 \quad (12)$$

In equation 12, J is incremented from J=1 to N−1, initially being one. Proceeding to step 132, the allocation bandwidth 108 is incremented to include the bandwidth of the next group:

$$R_{rt\text{-}vbr} = R_{rt\text{-}vbr} + PCR_{N-J+1} \quad (13)$$

Next, at decisional step 134, the resource allocator 72 determines whether the intermediate variable g is less than or equal to zero. If the intermediate variable g is greater than zero, the groups previously processed and having had their bandwidth added to the allocation bandwidth 108 are not sufficient to satisfy the QoS requirements for the rt-VBR group 90. Accordingly, the No branch of decisional step 134 returns to step 130 where J is incremented and the intermediate variable g is determined for a next group and the bandwidth of that group added to the allocation bandwidth 108. The intermediate variable g will reduce with each iteration and the allocation bandwidth 108 will increase. Upon the intermediate variable g becoming less than or equal to zero, the allocation bandwidth is sufficient to satisfy the QoS requirement. Accordingly, the Yes branch of decisional step 134 leads to the end of the process by which the allocation bandwidth 108 is recursively determined using groups and approximations for the groups. In this way, a network element can quickly and efficiently determine whether it can support additional requested rt-VBR or other suitable dynamic traffic. In addition, because the probabilistic method is based on system parameters, underallocation is eliminate and over-allocation minimized.

Although the present invention has been described with several embodiments, various changes and modifications may be suggested to one skilled in the art. It is intended that the present invention encompass such changes and modifications as fall within the scope of the appended claims.

What is claimed is:

1. A method for allocating transmission bandwidth to a group of real-time variable bit rate connections, comprising:
   determining an acceptable cell loss probability for said group of real-time variable bit rate connections based on quality of service requirements for real-time variable bit rate connections in said group of real-time variable bit rate connections;
   determining an allocation bandwidth for said group of real-time variable bit rate connections from a probability density function of an unweighted sum of individual cell arrival rates for said group of real-time variable bit rate connections, the allocation bandwidth comprising a bandwidth at which the probability of the unweighted sum of individual cell arrival rates exceeding the bandwidth is less than or at least substantially equal to the acceptable cell loss probability; and
   allocating the allocation bandwidth for transmission of said group of real-time variable bit rate connections.

2. The method of claim 1, further comprising determining an allocation bandwidth comprising a bandwidth at which the probability of the unweighted sum of individual cell arrival rates exceeding the bandwidth is less than or equal to the acceptable cell loss probability.

3. The method of claim 1, further comprising determining an allocation bandwidth comprising a minimum bandwidth at which the probability of the unweighted sum of individual cell arrival rates exceeding the bandwidth is less than or equal to the acceptable cell loss probability.

4. The method of claim 1, wherein the acceptable cell loss probability is based on a cell loss ratio for said group of real-time variable bit rate connections.

5. The method of claim 4, wherein the cell loss ratio for the real-time variable bit rate group comprises the lowest cell loss ratio allowed by any of the real-time variable bit rate connections in said group of real-time variable bit rate connections.

6. The method of claim 1, wherein the acceptable cell loss probability is based on a cell delay variation for said group of real-time variable bit rate connections.

7. The method of claim 1, wherein the acceptable cell loss probability comprises a lesser of a cell loss ratio and a cell delay variation for said group of real-time variable bit rate connections.

8. The method of claim 1, wherein the probability density function of the unweighted sum of individual cell arrival rates for said group of real-time variable bit rate connections is based on the quality of service requirements for the real-time variable bit rate connections.

9. The method of claim 1, wherein the probability density function of the unweighted sum of individual cell arrival rates for the real-time variable bit rate group is based on active ratios for the real-time variable bit rate connections.

10. The method of claim 1, further comprising:
    subdividing the probability density function into a plurality of groups, each group representing one or more events within the probability density function; and
    the allocation bandwidth comprising a bandwidth at which the probability of the unweighted sum of individual cell arrival rates for a set of groups exceeding the bandwidth is less than or at least substantially equal to the acceptable cell loss probability.

11. The method of claim 10, wherein each group comprises probabilities of receiving real-time variable bit rate traffic from a specified number of real-time variable bit rate connections at a peak cell rate at one time.

12. A method for determining whether a real-time variable bit rate connection can be accepted by a network element in a telecommunications network, comprising:

receiving a request for supporting a new real-time variable bit rate connection, the request including quality of service requirements for the new real-time variable bit rate connection;

determining an acceptable cell loss probability based on quality of service requirements for a real-time variable bit rate group of connections comprising the new real-time variable bit rate connection and existing real-time variable bit rate connections;

determining an allocation bandwidth for the real-time variable bit rate group of connections from a probability density function of an unweighted sum of individual cell arrival rates for the real-time variable bit rate group of connections, the allocation bandwidth comprising a bandwidth at which the probability of the unweighted sum of individual cell arrival rates exceeding the bandwidth is less than or at least substantially equal to the acceptable cell loss probability; and accepting the new real-time variable bit rate connection at the network element in response to determining the allocation bandwidth is available for allocation at the network element.

13. The method of claim 12, further comprising determining an allocation bandwidth comprising a bandwidth at which the probability of the unweighted sum of individual cell arrival rates exceeding the bandwidth is less than or equal to the acceptable cell loss probability.

14. The method of claim 12, further comprising determining an allocation bandwidth comprising a minimum bandwidth at which the probability of the unweighted sum of individual cell arrival rates exceeding the bandwidth is less than or equal to the acceptable cell loss probability.

15. The method of claim 12, wherein the acceptable cell loss probability comprises a lesser of a cell loss ratio and a cell delay variation for the real-time variable bit rate group of connections.

16. The method of claim 12, wherein the probability density function of the unweighted sum of individual cell arrival rates for the real-time variable bit rate group of connections is based on the quality of service requirements for the real-time variable bit rate connections in the real-time variable bit rate group of connections.

17. The method of claim 12, further comprising:

subdividing the probability density function into a plurality of groups, each group representing one or more events within the probability density function; and the allocation bandwidth comprising a bandwidth at which the probability of the unweighted sum of individual cell arrival rates for a set of groups exceeding the bandwidth is less than or at least substantially equal to the acceptable cell loss probability.

18. The method of claim 17, wherein each group comprises probabilities of receiving real-time variable bit rate traffic from a specified number of real-time variable bit rate connections at a peak cell rate at one time.

19. A bandwidth allocation system for use in a network element, comprising:

a computer-readable medium; and a real-time variable bit rate allocation system stored on the computer-readable medium, the real-time variable bit rate allocation system operable to determine an acceptable cell loss probability for a real-time variable bit rate group of connections based on quality of service requirements for real-time variable bit rate connections in the real-time variable bit rate group of connections, to determine an allocation bandwidth for the real-time variable bit rate group of connections from a probability density function of an unweighted sum of individual cell arrival rates for the real-time variable bit rate group of connections, the allocation bandwidth comprising a bandwidth at which the probability of the unweighted sum of individual cell arrival rates exceeding the bandwidth is less than or at least substantially equal to the acceptable cell loss probability.

20. The bandwidth allocation system of claim 19, the real-time variable bit rate allocation system further operable to allocate at the network element the allocation bandwidth for transmission of the real-time variable bit rate connections in the real-time variable bit rate group of connections.

21. The bandwidth allocation system of claim 19, wherein the real-time variable bit rate group of connections comprises a requested real-time variable bit rate connection, the real-time variable bit rate allocation system further operable to accept the requested real-time variable bit rate connection in response to determining the allocation bandwidth is available for allocation at the network element.

22. The bandwidth allocation system of claim 19, the real-time variable bit rate allocation system further operable to determine an allocation bandwidth comprising a bandwidth at which the probability of the unweighted sum of individual cell arrival rates exceeding the bandwidth is less than or equal to the acceptable cell loss probability.

23. The bandwidth allocation system of claim 19, the real-time variable bit rate allocation system further operable to determine an allocation bandwidth comprising a minimum bandwidth at which the probability of the unweighted sum of individual cell arrival rates exceeding the bandwidth is less than or equal to the acceptable cell loss probability.

24. The bandwidth allocation system of claim 19, the real-time variable bit rate allocation system further operable to select a lesser of a cell loss ratio and a cell delay variation for the real-time variable bit rate group of connections as the acceptable cell loss probability.

25. The bandwidth allocation system of claim 19, the real-time variable bit rate allocation system further operable to subdivide the probability density function into a plurality of groups, each group representing one or more events within the probability density function and to determine an allocation bandwidth comprising a bandwidth at which the probability of the unweighted sum of individual cell arrival rates for a set of groups exceeding the bandwidth is less than or at least substantially equal to the acceptable cell loss probability.

26. The bandwidth allocation system of claim 19, each group comprising probabilities of receiving real-time variable bit rate traffic from a specified number of real-time variable bit rate connections at a peak cell rate at one time.

* * * * *

UNITED STATES PATENT AND TRADEMARK OFFICE
CERTIFICATE OF CORRECTION

PATENT NO.    : 6,477,167 B1
DATED         : November 5, 2002
INVENTOR(S)   : Guoliang Wu It is certified that error appears in the above-identified patent and that said Letters Patent is hereby corrected as shown below:

Title page, Item [54] and Column 1, line 2,
Delete "BANDWITH" and insert -- BANDWIDTH --.

Title page,
Item [56] References Cited, OTHER PUBLICATIONS, after "McCloghrie, K., et al.", delete "Measurement" and insert -- Management --.
after "ITU Telecommunication Standardization Sector, COM" delete "-".
after "pp. 968-981" delete "." and insert -- , September, 1991. --.
after "Giroux, Natalie et al., Traffic", delete "Mangaement" and insert
-- Management --.

Column 2,
Line 4, after "rate", delete "(CPR)" and insert -- (PCR) --.

Column 5,
Line 36, after "switch", delete "12".

Column 6,
Line 54, after "$P_N($", delete "X" and insert -- x --.

Column 7,
Line 29, after "Active", delete "Ration" and insert -- Ratio --.
Line 34, delete "$PRC_N$" and insert -- $PCR_N$ --.
Line 58, after "1", delete "connections" and insert -- connection --

Column 8,
Line 38, after "is", delete "the".

UNITED STATES PATENT AND TRADEMARK OFFICE
CERTIFICATE OF CORRECTION

PATENT NO.     : 6,477,167 B1
DATED          : November 5, 2002
INVENTOR(S)    : Guoliang Wu It is certified that error appears in the above-identified patent and that said Letters Patent is hereby corrected as shown below:

Column 9,
Line 62, after "is" delete "eliminate" and insert -- eliminated --.

Signed and Sealed this

Seventeenth Day of June, 2003

JAMES E. ROGAN
*Director of the United States Patent and Trademark Office*